United States Patent [19]

Sun

[11] Patent Number: 5,609,974
[45] Date of Patent: Mar. 11, 1997

[54] RECHARGEABLE BATTERY POLYMERIC ELECTROLYTE

[75] Inventor: Luying Sun, Stoughton, Mass.

[73] Assignee: Battery Engineering, Inc., Hyde Park, Miss.

[21] Appl. No.: 511,470

[22] Filed: Aug. 4, 1995

[51] Int. Cl.$^6$ .............. H01M 6/16; H01M 6/18; C08J 5/20; C25B 13/00
[52] U.S. Cl. .......... 429/192; 429/198; 521/25; 204/296
[58] Field of Search ............... 429/192, 198; 204/296; 521/25

[56] References Cited

U.S. PATENT DOCUMENTS

| | | | |
|---|---|---|---|
| 4,822,471 | 4/1989 | MacDonald | 204/296 |
| 4,908,283 | 3/1990 | Takahashi et al. | 429/192 |
| 5,240,791 | 8/1993 | Izuti et al. | 429/192 |
| 5,294,501 | 3/1994 | Chaloner-Gill | 429/192 |
| 5,296,318 | 3/1994 | Godz et al. | 429/192 |
| 5,300,375 | 4/1994 | Chaloner-Gill | 429/192 |

*Primary Examiner*—Kathryn L. Gorgos
*Assistant Examiner*—Edna Wong
*Attorney, Agent, or Firm*—Shlesinger, Arkwright & Garvey

[57] ABSTRACT

This invention is directed to a novel solid polymer electrolyte more particularly thin film terpolymer networks are disclosed that are highly conductive at ambient temperatures. This solid polymer electrolyte can be produced as a thin film that results from the polymerization of three selected monomers together with a lithium salt and plasticizers. The resulting solid polymer electrolyte does have excellent mechanical properties and ionic conductivity at ambient temperatures and can be used in the fabrication of a solid state battery and other solid state electrochemical devices such as supercapacitors, fuel cells, sensors, electrochromic devices or the like.

15 Claims, 2 Drawing Sheets

RECHARGEABLE BATTERY POLYMERIC ELECTROLYTE

BACKGROUND

This invention relates to rechargeable battery cells in which ions of a source electrode material move between cell electrodes through an intermediate electrolyte during the charge and discharge cycles of the cell. More particularly it is concerned with a crosslinked solid polymer electrolyte which terpolymer network plus salt plus a plasticizer constitutes the polymer electrolyte that is ionically conductive. The solid polymer electrolyte is formed by first dissolving an electrolyte salt in a solution including a combination of selected monomers together with a plasticizer and then spreading the solution into a thin layer whereupon the layer is heated or otherwise subjected to a source of energy to effect its polymerization. Any one of the resulting solid polymer electrolytes is well adapted to be used in solid state batteries, supercapacitors, fuel cells, sensors, electrochromic devices and the like.

Solid polymer electrolytes have been proposed in the past for use in place of liquid electrolytes in such equipment because they combine in one material the function of electrolyte, separator, and binder for the electrode materials, thereby reducing the complexity of the ultimate structure. The advantages inherent in the use of a solid polymer electrolyte are the elimination of possible leakage and it preclude the possibility of dangerous increases in pressure which sometimes occur when volatile liquid electrolytes are present. Further such solid polymer electrolytes can be fabricated as thin films which permit space efficient batteries to be designed. Also flexible solid polymer electrolytes can be fabricated which allow for volume changes in the electrochemical cell without physical degradation of the interfacial contacts.

A number of solid polymer electrolytes have been suggested for use in the prior art such as thin films formed by complexation between lithium salt and linear polyether for example poly(ethylene oxide) and poly(propylene oxide). Although these solid polymer electrolytes do have some significant properties such as high electrochemical and chemical stability characteristics as well as ease of fabrication in the form of thin films, they have not met with any appreciable commercial success because the conductivity of such electrolytes at ambient temperatures is poor. The need to restrict the use of such electrolytes in electrochemical devices at elevated temperatures clearly limits the number of possible useful applications.

Various attempts have been made to improve the ionic conductivity of polymer electrolytes by a selection of new polymeric materials such as cation conductive phosphazene and siloxane polymers. Other suggestions include the use of the addition of plasticizers to polymer electrolytes to form "wet" polymer or "gel electrolyte" which procedure does improve ambient temperature conductivity but this is done at the expense of mechanical properties. So to date no commercially useful solid polymer electrolyte has been developed in the form of a thin film that has good mechanical properties and ionic conductivity in the range of $\geq 10^{-3}$ S/cm at ambient temperatures as well as enhanced electrochemical stability for use in, for example, a high energy-rechargeable solid state battery or for other applications in electrochemical units in which high ionic conductivity at ambient temperatures is a requirement.

BRIEF DESCRIPTION OF THIS INVENTION

The solid polymer electrolytes of this invention result from polymerizing any one of a number of various solutions formed from selected monomers together with a salt and a plasticizer adapted to produce a crosslinked network with excellent mechanical properties and enhanced ambient temperature conductivity. Prior to the polymerization step the solution can be either sprayed onto the surface of an electrode to be polymerized in situ upon being heated for a few minutes or by being photocured at room temperature or it may be cast on a solid surface to be polymerized in the form of a thin film having excellent mechanical properties. In another form a solution can be sprayed onto a suitable fabric to form a thin layer on the surface of an electrode or laid on a flat surface whereupon that layer is then heated for a few minutes or the solution is subjected to a photocuring step at room temperature to produce a reinforced solid polymer electrolyte film.

The solid polymer electrolytes so produced are well adapted to be used in high energy rechargeable solid state batteries. These solid polymer electrolytes will also find use in other electrochemical devices such as supercapacitors, fuel cells, sensors and electrochromic devices.

DETAILED DISCLOSURE

Figure 1:
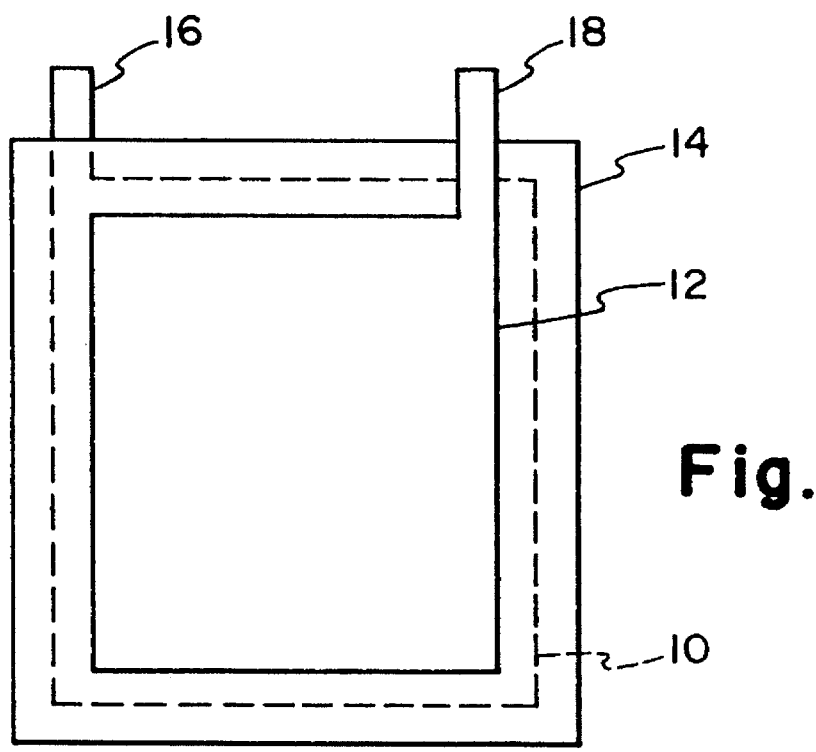
FIG. 1 is top plan view of a typical solid state battery constructed with one form of the present solid polymer electrolyte of this invention.

A typical solid polymer electrolyte for a solid state battery as an example is made according to the present invention by polymerizing a thin layer of a solution containing three monomers, an electrolyte salt and a plasticizer. One of the monomer to be selected is a compound having two acryloyl functionalities which serves as a crosslinking agent for example a diacrylate. Another selected monomer is a compound having one acryloyl or allyl functionality and also contains groups with high polarity such as a carbonate or a cyano group. Another of the selected monomers is a compound having one acryloyl functionality and an oligo(oxyethylene) group ($-CH_2CH_2O-$).

Within the solid polymer electrolyte produced upon polymerizing the above described solution, the monomer which includes the cyano or carbonate group serves to enhance the conductivity since either one of these groups provides an appreciable acceptor number which quantifies the possibility for anion solvation thus making the electrolyte salt more conductive. The monomer having the oligo(oxyethylene) side chain provides the resulting polymer with flexibility and free volume for the movement of ions, and also provides the resulting solid polymer electrolyte with compatibility with plasticizers. The polymerization of this solution results in the formation of a homogeneous solid polymer electrolyte film without phase separation.

These crosslinked solid polymer electrolytes are preferably terpolymer based networks having the following structure:

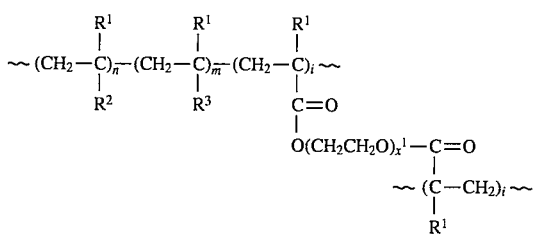

wherein:

R$^1$ is selected individually from the group consisting of hydrogen, C$_{1-10}$ alkyl, fluorinated C$_{1-10}$ alkyl groups.

R$^2$ is selected from the group consisting of moieties having the structure

R$^3$ is —CN or selected from the group having the structure

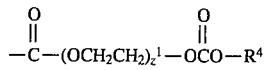

R$^4$ is selected from the group consisting of C$_{1-10}$ alkyl, fluorinated C$_{1-10}$ alkyl, C$_{1-10}$ aryl, and fluorinated C$_{1-10}$ aryl.

x$^1$, y$^1$, and z$^1$ may be same or different and are integers in the range of from 1 to 20 inclusive.

n, m, and i are mole fractions of monomers, and are greater than 0 and smaller than 1.

The solid polymer electrolyte can be formed in situ by spraying the solution consisting of the monomers, salt and plasticizers on the surface of an electrode, After being cast in a thin layer on such a surface the solution can then be subjected to either heat for a short time or to a photocuring process to produce the solid polymer electrolyte as thin as 1 mil thick in place.

Alternatively the monomer, salt and plasticizer solution can be polymerized in the form of a thin, mechanically sound layer by spraying the solution as a thin layer on a solid substrate and then using heat or the photocuring process for maturing the solid polymer electrolyte. If a still stronger film is deemed desired a measured amount of the solution can be sprayed onto a reinforcing fabric laid on the surface of of the electrode or on a solid substrate and then cured by heat or a photocuring step. The thickness of such a reinforced solid polymer electrolyte can be controlled by the use of a fabric with the desired thickness.

Solid polymer electrolyte films are prepared as taught herein in a range of about 1 to 4 mils and such films are useful in a variety of contexts. Since the solid polymer electrolyte films are prepared by polymerization of monomers with an electrolyte salt and plasticizer, the resulting combinations between the polymer and plasticizers as well as the complexation between the polymer and salt will proceed at the molecular level, i. e. nano complexation. This produces a solid polymer electrolyte film which exhibits useful ambient temperature ionic conductivity without phase separation. Especially, the fabric reinforced solid polymer electrolytes exhibit excellent mechanical strength as well as ambient temperature conductivity.

An important utility for this solid polymer electrolyte is in the fabrication of solid state rechargeable batteries comprising a positive electrode, negative electrode, and a solid polymer electrolyte film. The negative electrode is usually metallic lithium or a carbonaceous material such as coke or graphite. Alternatively, intercalating metal oxides such as tungsten or iron oxides could be used as negative electrode material. The positive electrode can be made of lithiated metal oxide such as LiCoO$_2$, LiNiO$_2$, and LiMn$_2$O$_4$. Also a material such as V$_6$O$_{13}$ can be used for a positive electrode.

EXAMPLE 1

A typical terpolymer based solid polymer electrolyte was prepared by in situ polymerization of three monomers with a lithium salt and a plasticizer. The monomers were 2-ethoxyethyl acrylate (EA), ethylene glycol ethyl carbonate methacrylate. (EGECM), and tri(ethylene glycol) dimethacrylate (TEDM). EA and TEDM were purchased from Aldrich Chemical Company, Milwaukee, Wis., while EGECM was synthesized in the following manner:

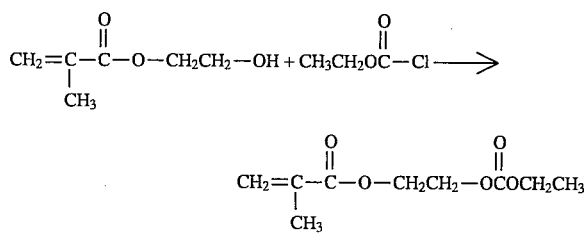

The reaction to produce the ethylene glycol ethyl carbonate methacrylate was accomplished as follows:

A 500 ml two-neck flask was fitted with an argon inlet and equipped with a magnetic stirrer and 26.03 g (0.20 mol) of 2-hydroxyethyl methacrylate, 150 ml of anhydrous tetrahydrofuran and 17.40 g (0.22 mol) of dry pyridine were placed therein. The flask was cooled to 0–5° C. and 23.87 g (0.22 mol) of ethyl chloroformate was added dropwise in one hour under argon atmosphere. Precipitates of pyridine hydrochloride salt formed as ethyl chloroformate was added. At the conclusion of the addition procedure, the mixture was stirred at room temperature for 14 hours. The mixture was then filtered. The tetrahydrofuran solvent was removed from the filtrate using a rotary evaporator. The resulting residue was taken up in 50 ml of methylene chloride, washed with water three times, and dried over MgSO$_4$. Distillation gave 38.35 g of ethylene glycol ethyl carbonate methacrylate, 90%, b.p. 74°–77° C./0.53 torr. The identity of the product was confirmed using $^1$H NMR spectroscopy ($^1$H NMR, CDCl$_3$/δ): 1.32 (t,3H, CH$_3$—CH$_2$O—); 1.95 (s, 3H, CH$_2$=C(CH$_3$)—); 4.22 (q, 2H, CH$_3$CH$_2$O—); 4.38 (m, 4H, —OCH$_2$CH$_2$O—); 5.87 (d,2H, CH$_2$=C(CH$_3$)–).

A solution of an electrolyte salt and the three above described monomers was prepared as follows: 0.20 g of LiPF$_6$ was dissolved in 1.00 g mixture consisting of plasticizers such as ethylene carbonate and propylene carbonate (50/50, w/o). To this solution, was added 0.02 g of benzoyl peroxide polymerization initiator and then to the resulting solution were added 0.10 g of 2-ethoxyethyl acrylate, 0.10 g of ethylene glycol ethyl carbonate methacrylate and 0.03 g of tri(ethylene glycol) dimethacrylate. The final solution was then spread onto stainless steel foil and then heated at a temperature of 85° C. to initiate and to complete the polymerization reaction within 5 minutes. When cooled to room temperature it was found that a free-standing film about 4 mils thick was obtained. Further data concerning the product of this example are set forth in Table 1 as Sample No. 1.

EXAMPLE 2

In this instance a polymerizable solution was made as described in Example 1. This solution was cast onto a 3 cm by 3 cm piece of non-woven Hollytex® fabric made by Ahlstron Filtration Inc. of Mount Holly Springs, Pa. The fabric was supported on a sheet of Mylar® film. The polymerizable solution was the same as that described in Example 1 and was sprayed onto the fabric. It was then heated at 85° C. for five minutes to produce the solid film 2 mil thick. After the polymerized fabric reinforced film has cooled to room temperature the film can be peeled off of the Mylar® support and will be found to have high mechanical strength. Additional data relative to this solid polymer electrolyte are recorded in Table 1 as Sample No. 2.

Table 1

In Table 1 Samples Nos. 1, 2, 5, 6 are solid polymer electrolyte films made with the monomers described in Examples 1 and 2. The Samples Nos. 3 and 4 are films made with the same solution described above except with a substitution of acrylonitrile for the ethylene glycol ethyl carbonate methacrylate monomer in a different stoichiometric ratio.

hot-pressing a mixture consisting of $LiCoO_2$ (51%), polyacrylonitrile as binder (2.5%), $LiPF_6$ (5%) and ethylene/propylene carbonate plasticizer (36%) onto an aluminum foil in a layer that is 2.22 cm×3.49 cm. Then a polymerizable solution consisting of 0.35 g a monomer mixture of 2-ethoxyethyl acrylate, acrylonitrile and tri(ethylene glycol) dimethacrylate in a proportion 5/1/1 w/o mixed with 0.15 g of $LiPF_6$, 1.05 g of the ethylene carbonate/propylene carbonate plasticizers in a 50/50 w/o and 0.02 g of benzoyl peroxide to initiate the polymerization reaction is cast on the surface of that electrode and heated to 70° C. for polymerization. The solution is polymerized within 4 minutes and a solid film is produced on the electrode surface that is 1 mil thick.

Other Examples of Such Films

A number of solid polymer electrolyte films were prepared by in situ polymerization of three monomers with a lithium salt and an addition of ethylene/propylene carbonate (EC/PC) as plasticizer. The monomers were 2-ethoxyethyl acrylate (EA), acrylonitrile (AN), and tri(ethylene glycol) dimethacrylate (TEDM). The lithium salts were Lithium trifluoromethanesulfonate (LiTf), lithium trifluoromethane-

TABLE 1

| Sample No. | Monomer ratio | Plasticizer ratio | $LiPF_6$/ monomers/ plasticizers | Wt. % of fabric as of SPE film | Conductivity (S cm$^{-1}$) |
|---|---|---|---|---|---|
| 1 | EA/EGECM/TEDM 3.33/3.33/1.00 | EC/PC 1.00/1.00 | 1.00/1.15/5.00 | 0 | 2.6 × 10$^{-3}$ |
| 2 | EA/EGECM/TEDM 3.33/3.33/1.00 | EC/PC 1.00/1.00 | 1.00/1.15/5.00 | 35 | 1.4 × 10$^{-3}$ |
| 3 | EA/AN/TEDM 5.63/1.88/1.00 | EC/PC 1.00/1.00 | 1.00/1.47/6.53 | 0 | 2.5 × 10$^{-3}$ |
| 4 | EA/AN/TEDM 5.63/1.88/1.00 | EC/PC 1.00/1.00 | 1.00/1.47/6.53 | 35 | 1.1 × 10$^{-3}$ |
| 5 | EA/EGECM/TEDM 4.00/2.67/1.00 | ED/EPM 1.00/1.00 | 1.00/1.15/5.00 | 35 | 1.4 × 10$^{-3}$ |
| 6 | EA/EGECM/TEDM 4.00/2.67/1.00 | EC/NMP 2.00/1.00 | 1.00/1.15/5.00 | 8 | 1.9 × 10$^{-3}$ |

In Table 1, the abbreviations are as follows: EA, 2-ethoxyethyl acrylate; EGECM, ethylene glycol ethyl carbonate methacrylate; AN, acrylonitrile; TEDM, tri(ethylene glycol) dimethacrylate; EC, ethylene carbonate; PC, propylene carbonate; EPN, 3-ethoxypropionitrile; NMP, N-methyl-2-pyrrolidinone.

In another form, this invention can be used for polymerizing a thin solid polymer electrolyte film in situ on a positive electrode element. Such an electrode is produced by sulfonimide ($LiNTf_2$) and lithium hexafluorophosphate ($LiPF_6$). The monomers were polymerized at temperatures within a range of from 80–100° C. for periods of from 5–10 minutes. Data relating to the composition of and proportions of the compounds in these different solid polymer electrolyte films are set forth in Table 2.

TABLE 2

| Sample No. | Monomer ratio (EA/AN/TEDM) | Li salt | Li salt:monomer:EC-PC | Initiator | Resulting electrolyte film |
|---|---|---|---|---|---|
| 7 | 10:2:1 | LiTf | 1:2:6 | BPO | soft |
| 8 | 10:4.7:1 | LiTf | 1:2.4:6 | BPO | flexible |
| 9 | 5:1:1 | LiTf | 1:2:6 | BPO | flexible |
| 10 | 1.5:0.3:1 | LiTf | 1:2:6 | BPO | brittle |
| 11 | 5:2.5:1 | LiTf | 1:2:6 | BPO | flexible |
| 12 | 5:2.5:1 | $LiNTf_2$ | 1:2:6 | BPO | flexible |
| 13 | 5:2.5:1 | $LiPF_6$ | 1:2:6 | AIBN | flexible |

In Table 2, the abbreviations are as follows: EA, 2-ethoxyethyl acrylate; AN, acrylonitrile; TEDM, tri(ethylene glycol) dimethacrylate; LiTf, Lithium trifluoromethanesulfonate; LiNTf$_2$, lithium trifluoromethanesulfonimide; EC, ethylene carbonate; PC, propylene carbonate; BPO, benzoyl peroxide; AIBN, azobis isobutyronitrile. Polymerization for all of the Samples was carried out at the temperatures of from 80–100° C. for 5–10 minutes.

Additional lithium salts such as LiAsF$_6$, LiBF$_4$, LiClO$_4$, and lithium salts of the perfluoro-sulfonate family such as LiSO$_3$(CF$_2$)$_3$CF$_3$ and LiSO$_3$(CF$_2$)$_9$CF$_3$ can be used.

Additional examples of plasticizers such as alkyl cyclic carbonates, linear carbonates, alkyl esters, cyclic ethers, glymes, alkyl nitriles, and 1-substituted pyrrolidinones can be used.

Cell Production

Figure 2:
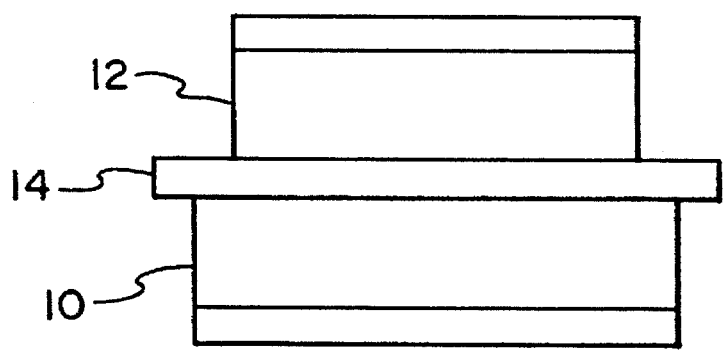
FIG. 2 is an end view of the battery shown in FIG. 1.

A rechargeable cell was assembled as shown in FIGS. 1 and 2 using a coke negative electrode 10, a LiCoO$_2$ positive electrode 12 and a solid polymer electrolyte film 14 prepared by the method described above. The coke negative electrode, was made by hot-pressing a mixture consisting of 41.2% of Mitsubishi MBC-N coke, 4.8% acetylene carbon black, 3.0% polyacrylonitrile, 5.7% LiPF$_6$ together with 45.3% of ethylene carbonate/propylene carbonate plasticizer onto a copper foil 2.54 cm by 3.81 cm. The negative electrode was 11.5 mil thick and had a 19 mg/cm$^2$ carbon loading. This electrode had a current lead 16 for connecting it into a circuit. The positive electrode 12 was made by hot-pressing a mixture consisting of 50.9% LiCoO$_2$, 5.1% acetylene carbon black, 2.5% polyacrylonitrile, 5.1% LiPF$_6$ and 36.4% of the above plasticizer on an aluminum foil 2.22 cm by 3.49 cm. This positive electrode was 10 mil thick and had 37 mg/cm$^2$ LiCoO$_2$ loading. The positive electrode had a current lead 18 for connecting it into a circuit. The solid polymer electrolyte film was made with 11% of LiPF$_6$ salt in 16.5% of a solution of monomers wherein the ratio of 2-ethoxyethyl acrylate to acrylonitrile to tri(ethylene glycol) dimethacrylate equaled 5.88/1.88/1.00 w/o, with 71.4% ethylene carbonate/propylene carbonate and 1.1% benzoyl peroxide. This mixture was spread on a polyester fabric 3.8 cm by 5.0 cm and heated at 70° C. for 8 minutes. This solid polymer electrolyte film 14 was sandwiched between positive and negative electrodes and the cell was sealed in a foil/poly outer bag.

Figure 3:
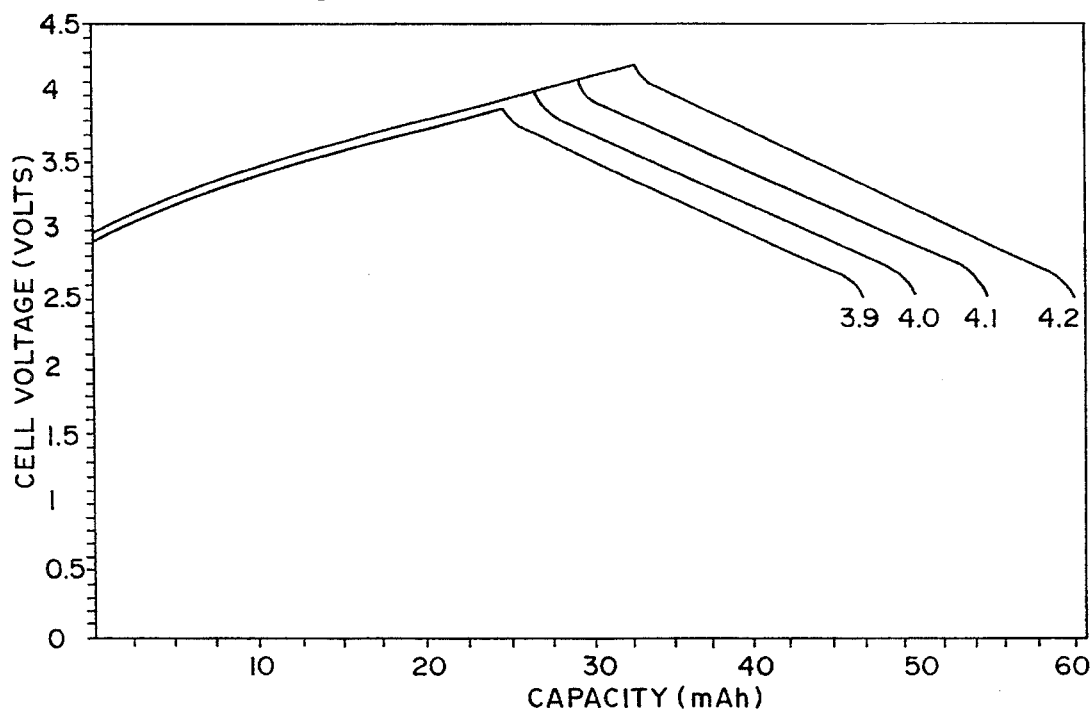
FIG. 3 shows the potential versus capacity for a carbon/$LiCoO_2$ cell having a solid polymer electrolyte made as taught herein.

This cell was cycled at a constant current. The charging current was the same as the discharge current of 0.52 mA/cm$^2$. FIG. 3 shows typical voltage profiles of the cell of nominal area 7.76 cm$^2$. The cell was discharged to an end point of 2.5 V at ambient temperature of 22–25° C. The charging was terminated when the cell voltage reached 3.9, 4.0, 4.1, and 4.2 V respectively. It is obvious that the solid polymer electrolyte was electrochemically stable to 4.2 V.

Figure 4:
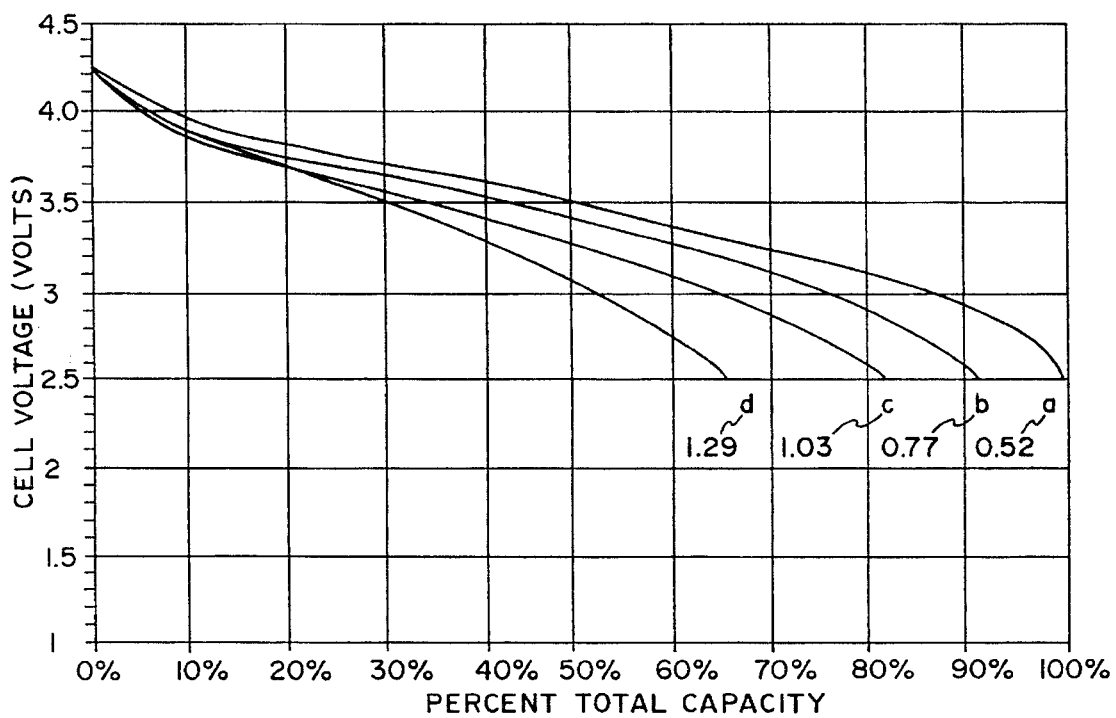
FIG. 4 shows potentials versus percent capacity when the battery is discharged at various current levels.

FIG. 4 shows voltages versus capacity when discharged at various current levels for this cell. The discharge current density was 0.52 (curve a), 0.77 (b), 1.03 (c), and 1.29 (d) mA/cm$^2$ respectively. The rated capacity was 29.5 mAh when discharged at a current density of 0.52 mA/cm$^2$, i.e. 4 mA, curve "a". The ability of the cell to perform well on continuous discharge at higher rates was clearly seen. Greater than 80% of rated capacity was obtained when the cell was discharged at a current of 1.03 mA/cm$^2$, i. e. curve "c".

The above described "prismatic" cell has a flat electrode but it is obvious that other configurations such as a "jelly roll" or a spirally wound electrode based cells could be made since the cell as a whole is flexible and the solid polymer electrolyte film is mechanically strong.

It is believed that the more extensive crosslinking resulting from the polymerization of the above described monomers produces a polymer network which is less thermally sensitive, i.e. is much less likely to flow when it gets hot. The corollary is that if the electrolyte is put in place before it starts to polymerize, then it does not have to be manipulated afterwards, and consequently it can be more dimensionally stable. Further because the flowability of the liquid form of the monomers they can applied to a surface in a very thin coating to be polymerized to form a very thin and uniform solid polymer electrolyte film. Also since the complexation between the compounds are made while mixed in solution, they are joined more completely, i.e. at a nanomolecular level.

While the following claims define several forms of the solid polymer electrolyte of this invention which has been set forth above it is believed that modifications thereof will occur to those skilled in the art that may fall within the scope of these claims.

I claim:

1. A solid polymer electrolyte comprised of the incorporation of a salt in a crosslinked terpolymer network formed by the polymerization of a first monomer having two acryloyl functionalities; a second monomer selected from group consisting of a monomer having one acryloyl functionality and a monomer having one allyl functionality, said second monomer also having a high polarity resulting from the incorporation therein of a high polarity group selected from the group consisting of a compound having a carbonate functionality and a cyano functionality; and a third monomer selected from the group having an acryloyl functionality and an oligo(oxyethylene) group.

2. A solid polymer electrolyte as claim 1 that includes a plasticizer in said network.

3. A solid polymer electrolyte of claim 2 polymerized in the form of a thin film having good mechanical properties and ionic conductivity in the range of $\geq 10^{-3}$ S/cm at ambient temperatures.

4. A solid polymer electrolyte as in claim 3 produced by the polymerization of said monomers in situ on a fabric reinforcement.

5. A solid polymer electrolyte as in claim 2 produced by polymerization of said monomers in situ on an electrode.

6. A solid polymer electrolyte as in claim 2 produced by the polymerization of said monomers in situ on a fabric reinforcement.

7. A solid polymer electrolyte as in claim 1 produced by the polymerization of said monomers in situ on a fabric reinforcement.

8. A solid polymer electrolyte comprising a lithium salt and a plasticizer in a crosslinked polymer network having the following structure:

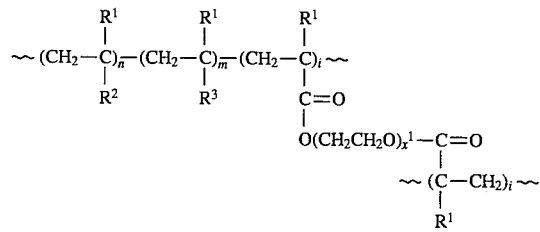

wherein:

R$^1$ is selected individually from the group consisting of hydrogen, C$_{1-10}$ alkyl, fluorinated C$_{1-10}$ alkyl groups.

$R^2$ is selected from the group consisting of moieties having the structure:

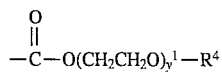

$R^3$ is —CN or selected from the group having the structure:

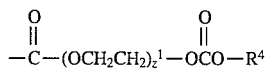

$R^4$ is selected from the group consisting of $C_{1-10}$ alkyl, fluorinated $C_{1-10}$ alkyl, $C_{1-10}$ aryl, and fluorinated $C_{1-10}$ aryl.

$x^1$, $y^1$, and $z^1$ may be same or different and are integers in the range of from 1 to 20 inclusive.

n, m, and i are mole fractions of first, second, and third monomers, and are greater than 0 and smaller than 1.

9. A solid polymer electrolyte as in claim 8 wherein said lithium salt is selected from the group consisting of $LiPF_6$, $LiAsF_6$, $LiBF_4$, $LiClO_4$, $LiN(SO_2CF_3)_2$, and lithium salts of the perfluoro-sulfonate family.

10. A solid polymer electrolyte as in claim 9 wherein said plasticizer is selected from the group consisting of alkyl cyclic carbonates, linear carbonates, alkyl esters, cyclic ethers, glymes, alkyl nitriles, and 1-substituted pyrrolidinones.

11. A solid polymer electrolyte as in claim 8 wherein the network is polymerized in the form of a thin film.

12. A solid polymer electrolyte as in claim 11 wherein the thin film is polymerized in situ on an electrode.

13. A solid polymer electrolyte as in claim 8 wherein said network is polymerized on a fabric reinforcement.

14. A solid polymer electrolyte as in claim 8 wherein the first monomer is first 2-ethoxyethyl acrylate, the second monomer is ethylene glycol ethyl carbonate methacrylate, and the third monomer is tri(ethylene glycol) dimethacrylate.

15. A solid polymer electrolyte as in claim 8 wherein the first monomer is first 2-ethoxyethyl acrylate, the second monomer is acrylonitrile, and the third monomer is tri(ethylene glycol) dimethacrylate.

\* \* \* \* \*